(12) United States Patent
Rohrig

(10) Patent No.: US 10,875,253 B2
(45) Date of Patent: *Dec. 29, 2020

(54) METHOD FOR THE PRODUCTION OF A PACIFIER TEAT

(75) Inventor: Peter Rohrig, Vienna (AT)

(73) Assignee: MAM BABYARTIKEL GESELLSCHAFT M.B.H., Vienna (AT)

( * ) Notice: Subject to any disclaimer, the term of this patent is extended or adjusted under 35 U.S.C. 154(b) by 1129 days.

This patent is subject to a terminal disclaimer.

(21) Appl. No.: 13/025,711

(22) Filed: Feb. 11, 2011

(65) Prior Publication Data

US 2011/0202090 A1    Aug. 18, 2011

Related U.S. Application Data

(63) Continuation-in-part of application No. PCT/AT2010/000326, filed on Sep. 10, 2010.

(30) Foreign Application Priority Data

Sep. 11, 2009  (AT) ................ A 1444/2009

(51) Int. Cl.
*B29C 65/18* (2006.01)
*B29C 65/02* (2006.01)
(Continued)

(52) U.S. Cl.
CPC .............. *B29C 65/18* (2013.01); *B29C 65/02* (2013.01); *B29C 65/026* (2013.01);
(Continued)

(58) Field of Classification Search
CPC .................. A61J 17/00; A61J 2017/001; A61J 2017/008; A61J 11/00; A61J 11/0035; A61J 11/006; A61J 11/0065; A61J 11/0055; A61J 17/001; A61J 17/008; A61H 13/00; B29K 2021/00; B29C 33/00; B29C 33/0033;
(Continued)

(56) References Cited

U.S. PATENT DOCUMENTS 1,289,777 A * 12/1918 Mahoney ........................ 156/160
1,537,860 A *  5/1925 Miller ..................... B29D 22/00
                                                             425/233
(Continued)

FOREIGN PATENT DOCUMENTS

AT        506 295 A4     8/2009
DE        828288 C       1/1952
(Continued)

OTHER PUBLICATIONS

English Translation of FR1119283.*
(Continued)

*Primary Examiner* — Darwin P Erezo
*Assistant Examiner* — Erin L Colello

(57) ABSTRACT

Method for the production of a pacifier teat and pacifier teat with a suction section forming a cavity, to which suction section a shaft adjoins, wherein an elastic hollow body having suction section and the shaft is pre-formed in an injection or in a dipping process and opposite wall sections of the pre-formed hollow body are connected with each other in the region of the shaft.

8 Claims, 7 Drawing Sheets

Figure 1:
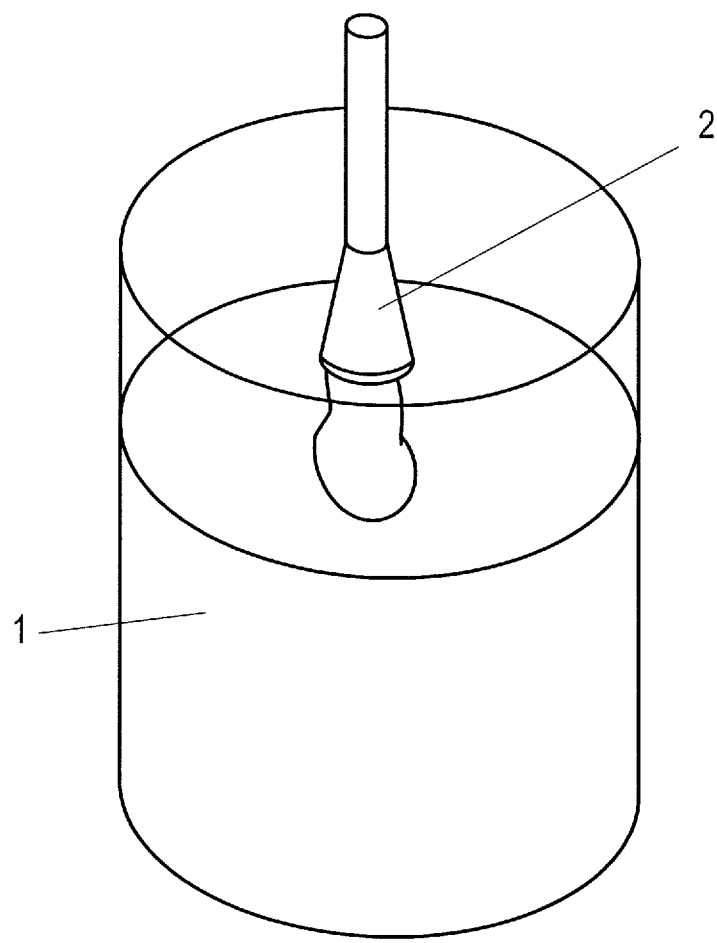

(51) Int. Cl.
| | |
|---|---|
| *B29C 65/00* | (2006.01) |
| *B29C 65/48* | (2006.01) |
| *B29C 65/54* | (2006.01) |
| B29L 22/00 | (2006.01) |
| B29L 22/02 | (2006.01) |
| B29L 31/00 | (2006.01) |

(52) U.S. Cl.
CPC ........ *B29C 65/483* (2013.01); *B29C 65/4815* (2013.01); *B29C 65/542* (2013.01); *B29C 66/004* (2013.01); *B29C 66/1122* (2013.01); *B29C 66/3242* (2013.01); *B29C 66/43121* (2013.01); *B29C 66/49* (2013.01); *B29C 66/7315* (2013.01); *B29C 66/73754* (2013.01); *B29C 66/8322* (2013.01); *B29C 66/919* (2013.01); *B29C 66/91411* (2013.01); *B29C 66/91445* (2013.01); *B29C 65/00* (2013.01); *B29C 66/30223* (2013.01); *B29C 66/71* (2013.01); *B29C 66/73161* (2013.01); *B29C 66/949* (2013.01); *B29K 2995/0046* (2013.01); *B29L 2022/00* (2013.01); *B29L 2022/025* (2013.01); *B29L 2031/703* (2013.01); *B29L 2031/7496* (2013.01); *Y10T 156/10* (2015.01); *Y10T 428/1352* (2015.01)

(58) Field of Classification Search
CPC . B29C 2033/0094; B29C 33/02; B29C 33/38; B29C 35/00; B29C 45/00; B29C 66/63; B29C 66/8322; B29C 66/73754; B29C 66/49; B29C 66/43121; B29C 66/004; B29C 66/3242; B29C 66/71; B29C 57/02; B29C 57/10; B29C 57/04; B29C 57/06; B29C 57/08; B29C 41/14; B29C 45/14467; B29C 45/7207; B29C 45/14336; B29C 45/72; B29C 66/431; B29L 2022/00; B29L 2022/025; B29L 2023/007; Y10T 156/10; B29D 22/00; B32B 37/0076; B32B 37/30; B32B 37/12
USPC .......... 606/234–236; 446/227; D24/193–199
See application file for complete search history.

(56) References Cited

U.S. PATENT DOCUMENTS

| | | | | |
|---|---|---|---|---|
| 2,520,773 A * | 8/1950 | Wilhelm Muller | ........... | 215/11.1 |
| 3,500,831 A * | 3/1970 | Schaar | ........... | 215/11.5 |
| 3,610,248 A * | 10/1971 | Davidson | ........... | A61J 17/00 |
| | | | | 606/236 |
| 3,669,112 A * | 6/1972 | Mager | ........... | A61J 17/001 |
| | | | | 215/11.1 |
| 3,923,067 A | 12/1975 | Hurst | | |
| 3,924,621 A | 12/1975 | Cassimally | | |
| 4,143,452 A * | 3/1979 | Hakim | ........... | A61J 17/00 |
| | | | | 156/245 |
| 4,623,069 A * | 11/1986 | White | ........... | 215/11.1 |
| 4,676,386 A * | 6/1987 | Phlaphongphanich | ...... | 215/11.1 |
| 4,834,099 A * | 5/1989 | Schrooten | ........... | 215/11.1 |
| 4,935,187 A * | 6/1990 | Vente | ........... | B29C 33/444 |
| | | | | 264/328.1 |
| 4,950,286 A * | 8/1990 | Meussdoerffer | ........... | 606/236 |
| 5,004,473 A * | 4/1991 | Kalantar | ........... | 606/234 |
| 5,403,349 A * | 4/1995 | Rohrig | ........... | 606/234 |
| 5,601,605 A * | 2/1997 | Crowe | ........... | A61J 17/006 |
| | | | | 604/77 |
| 6,325,817 B1 * | 12/2001 | Shen | ........... | 606/236 |
| 6,454,788 B1 * | 9/2002 | Ashton | ........... | 606/234 |
| 6,575,999 B1 * | 6/2003 | Rohrig | ........... | B29C 45/0055 |
| | | | | 606/234 |
| 6,818,162 B1 * | 11/2004 | Hoffman et al. | ........... | 264/46.4 |
| 7,144,416 B2 * | 12/2006 | Struckmeier et al. | ........ | 606/236 |
| D554,760 S * | 11/2007 | Brockhaus et al. | ........... | D24/194 |
| D567,383 S * | 4/2008 | Rohrig | ........... | D24/194 |
| D571,017 S * | 6/2008 | Rohrig | ........... | D24/194 |
| D582,046 S * | 12/2008 | Rohrig | ........... | D24/194 |
| 7,857,153 B2 * | 12/2010 | Ito et al. | ........... | 215/11.1 |
| 7,883,530 B2 * | 2/2011 | Tesini et al. | ........... | 606/236 |
| 7,931,672 B2 * | 4/2011 | Tesini et al. | ........... | 606/236 |
| 8,646,632 B2 * | 2/2014 | Vischer | ........... | A61J 17/00 |
| | | | | 128/859 |
| 8,834,669 B2 * | 9/2014 | Rohrig et al. | ........... | 156/308.2 |
| 9,999,574 B2 * | 6/2018 | Rohrig | ........... | A61J 11/007 |
| 2007/0238063 A1 * | 10/2007 | Tesini et al. | ........... | 433/7 |
| 2008/0188894 A1 * | 8/2008 | Hakim | ........... | 606/236 |
| 2010/0268276 A1 * | 10/2010 | Du Chesne | ........... | A61J 11/006 |
| | | | | 606/236 |
| 2010/0312276 A1 * | 12/2010 | Schofield | ........... | A61J 17/001 |
| | | | | 606/236 |

FOREIGN PATENT DOCUMENTS

| | | | | |
|---|---|---|---|---|
| DE | 2656819 A1 * | 6/1977 | ........... | A61J 17/001 |
| DE | 4318693 A | 12/1994 | | |
| DE | 10227787 A1 | 10/2003 | | |
| EP | 0 478 167 A2 | 4/1992 | | |
| EP | 1086804 A2 | 3/2001 | | |
| FR | 470550 A * | 9/1914 | ........... | A61J 17/001 |
| FR | 1 119 283 A | 6/1956 | | |
| FR | 1119283 * | 6/1956 | | |
| FR | 1119283 A * | 6/1956 | ........... | B29C 45/33 |
| GB | 130747 A * | 8/1919 | | |
| GB | 264390 A * | 1/1927 | | |
| GB | 2 192 549 A | 1/1988 | | |
| JP | 47-015289 A | 5/1972 | | |
| JP | H07156272 A | 6/1995 | | |
| JP | H07171895 A | 7/1995 | | |
| JP | 9-267392 A | 10/1997 | | |
| JP | H09267392 A | 10/1997 | | |
| WO | 86/03402 A1 | 6/1986 | | |
| WO | WO8603402 A1 * | 6/1986 | | |
| WO | 98/27928 A1 | 7/1998 | | |
| WO | 99/04745 A1 | 2/1999 | | |
| WO | 02/091954 A2 | 11/2002 | | |
| WO | 2004/087039 A1 | 10/2004 | | |
| WO | 2008/006128 A1 | 1/2008 | | |
| WO | WO2008006128 A1 * | 1/2008 | | |

OTHER PUBLICATIONS

English Translation of WO2008006128A1.*
English Translation of FR1119283A.*
English Translation of FR 470550 A.*
International Preliminary Report on Patentability dated Mar. 22, 2012; International Appln. No. PCT/AT2010/000326.
International Search Report: PCT/AT2010/000326.
Austrian Patent Office Search Report; dated Jul. 29, 2010.
Australian Patent Examination Report No. 2; dated Mar. 10, 2014; Patent Application No. 2010292955.
European Patent Office Opinion dated Feb. 21, 2014; Appln. No. 10 760 215.3-1706.
Chinese Office Action dated Dec. 27, 2013; Appln. No. 201080051226.4 Translated into German Language retranslated into English Language using Google Translate.
Pechiney Plastic Packaging Inc., "Solicitud 2238-2011" 7 Pages.

* cited by examiner

METHOD FOR THE PRODUCTION OF A PACIFIER TEAT

The invention relates to a method for the production of a pacifier teat with a suction section forming a cavity, to which suction section a shaft adjoins, and a pacifier teat with a suction forming a cavity, to which suction section a shaft adjoins.

A plurality of the most varied pacifiers is already known, in which a suction part is fastened to a shield. These concern suction parts which consist of a hollow body, so that the hollow body deforms elastically upon application of a suction pressure by the child and the cavity enclosed by the teat walls therefore becomes smaller. In so far as the baby or infant who is using the pacifier does not apply any suction force onto the hollow body, the latter assumes its initial shape again. This usual shape of hollow body teats corresponds substantially to a club shape, i.e. a shaft section, via which the hollow body teat is connected with the shield, which has a comparatively small cross-section, and which then widens to a freely protruding nipple part or suction section, which therefore has a comparatively large cross-section.

However, the use of such pacifiers by babies or infants disadvantageously brings it about that the rows of teeth of the baby or infant can not be fully closed in the region of the shaft of the pacifier. In particular in the region of the abutment of the jawbone or tooth, the elastic restoring force of the hollow body acts on the jawbone or on the teeth of the infant. This can be a contributory cause of a frontally open bite, i.e. a malposition of the teeth of the growing child.

From WO 99/04745 A it is already known to provide in a conventional hollow body teat a comparatively flat transmitter body which is angled so that the transmitter body can be held between the upper and lower incisors of an infant and thus trying to substantially permit a closing of the incisors. Due to the design of the teat as a hollow body, however, this angled transmitter body must also be constructed with double walls, so that a comparatively great wall thickness is also produced in the region of the transmitter body, which is flat compared with the remainder of the teat.

A similar solution is also described in WO 98/02132 A, in which here, however, a special teat body is provided which in the used position is arranged beneath the lip of the baby or infant, so that a lip contact with the upper palate area is possible.

Further special orthodontic hollow body teats are described for example in DE 102 27 787 A, DE 43 18 693 A and DE 828 288 C. Here also, however, the wall thickness of the hollow body teat in the region of the resting of the jawbone or tooth is limited downwards owing to the double-walled design of the hollow body.

From U.S. Pat. No. 3,924,621 in addition a pacifier teat is disclosed having a substantially closed-walled, bulbous suction body, which is connected with the pacifier shield via a plurality of connecting elements, with an opening remaining between the connecting elements, so that it is possible for the child's tongue to penetrate into this free space. Hereby, a direct contact of the child's tongue with the upper front teeth and with the palate is to be made possible. The lateral connecting elements are intended to serve as a type of guide for this purpose, in order to guide the tongue into its natural position.

From US 2004/087039 A a suction part is known which is formed so as to be solid in cross-section, in which the most varied of ventilation channels can be provided.

WO 98/27928 A1 discloses a conventional hollow body teat or alternatively a suction section designed as a whole with solid walls. In the hollow body or in the suction section constructed as a whole with solid walls, a pocket is provided to receive a tablet.

WO 96/20687 A1 shows a pacifier with a special suction part which has projections in the direction of the alveolar ridges. The suction body can be constructed here either hollow as a whole, or solid.

The aim of the present invention, however, is to provide a method for the production of a pacifier teat in which a teat is produced corresponding substantially to known hollow body teats, in which the pacifier teat is constructed in the region of the jawbone support or in the tooth closure area such that a frontally open bite, of which the use of the pacifier teat is a contributory cause, is avoided as far as possible.

According to the invention, this is achieved by a method of the type mentioned in the introduction, in which an elastic hollow body, having a suction section and the shaft, is pre-formed in an injection or in a dipping process, wherein opposite wall sections of the pre-formed hollow body are connected with each other in the region of the shaft. According to the invention, consequently a two-stage method is provided, in which firstly a hollow body is produced, the exterior shape of which corresponds substantially to known hollow body teats. After this hollow body pacifier teat has been pre-formed, opposite wall sections of the hollow body are connected with each other in the region of the shaft, so that in the shaft region, i.e. in the region of the jawbone- or tooth abutment by the infant, a substantially single-walled construction of the pacifier teat is produced which is constructed as a hollow body in the suction section. Through this production method, it can be prevented in particular that the finished pacifier teat exerts a pressure onto the jawbone or onto the teeth in the region of the jawbone- or tooth abutment owing to the elastic restoring force of the hollow body, which pressure promotes the formation of an open frontal bite; i.e. by the permanent connection of opposite wall sections, advantageously the elastic restoring behaviour of the pacifier teat is eliminated in the shaft region.

The connection of the opposite wall sections can advantageously be achieved in that a connecting material in viscous form is introduced between the opposite wall sections, and the connecting material is subsequently transferred into an elastic state under the influence of pressure and/or heat for the purpose of connecting the wall sections. Through the introduction of a viscous connecting material, the previously viscous connecting material connects itself intimately with the wall sections on transition into the elastic state, so that the connected wall sections also remain connected with each other in the case of a stressing under tension or expansion.

With regard to as little influencing as possible of the elasticity behaviour of the pacifier teat in the shaft region, in particular a material having substantially the same chemical structure as the material from which the pre-formed hollow body was produced, can be used as the viscous connecting material. In so far as the hollow body therefore consists of a silicone material or of a (natural) rubber material, advantageously a silicone- or latex material is also used as viscous connecting material. With the use of such viscous connecting materials of the same kind, during the hardening process, i.e. on conversion of the viscous connecting material into its elastic state, advantageously a chemical cross-linking can occur between the wall sections which are to be connected and the connecting material, so that a particularly intimate connection of the wall sections is achieved, substantially forming a single homogeneous layer. In order, on the one hand, to achieve a reliable connection of the wall sections, and on the other hand to prevent the entry of connecting material out into the cavity via the wall sections which are to be connected, it is advantageous if approximately 0.5 to 3 ml, in particular substantially 1 to 2 ml, viscous connecting material is introduced between the wall sections which are to be connected.

In the case of a rubber hollow body, it is advantageous if the connecting material, on introduction between the wall sections which are to be connected, has a proportion of 40-60% latex and a viscosity of approx. 15-30 sec Ford beaker 5. Hereby, advantageously, owing to the low viscosity of the latex concentrate, the result is that the introduced amount is distributed substantially uniformly in the region of the wall sections which are pressed against each other.

Alternatively, however, a viscous connecting material can also be used which has a different chemical structure from the material of the pre-formed hollow body. A bonding then takes place here, i.e. a connecting of the wall sections by adhesion and not by chemical or physical cross-linking.

A particularly intimate connection of the opposite wall sections can be achieved in a simple manner if the pre-formed hollow body consists of a rubber material which is not yet fully vulcanized, wherein the wall sections which are to be connected are brought in contact with each other before the rubber material is fully vulcanized by means of the supply of heat. Rubber material in the sense according to the invention is understood to mean vulcanized natural rubber, as is obtained in particular from the chyle (latex) of tropical plants. Usually the latex-material or latex-composition is heated or pre-vulcanized, respectively, for approximately 24 h at 40 to 70° C. before the pre-formed hollow body is produced by dipping a mould in a latex bath; tests have shown that shortening the time of pre-vulcanization, especially in case the latex-material or latex-composition is heated for 18 h to 20 h, preferably for substantially 20 h, to about 40 to 70° C., preferably to substantially 50 to 55° C., a not fully vulcanized hollow body is achieved, whose wall sections can be permanently connected in an easy way even without the addition of an external connecting material. Due to the shortened time of pre-vulcanization the latex-material or latex-composition has a higher value of the so called "swelling index"; the swell value of the pre-formed, not fully vulcanized hollow body is preferably between 80 and 100, preferably substantially 90.

In order to make possible a pressure equalization between the substantially closed-walled suction section and the environment, so that the sucking sensation for the infant on the finished pacifier teat corresponds substantially to conventional hollow body pacifier teats, it is advantageous if the pre-formed hollow body has an opening, with a linear element, running into the cavity formed by the suction section, being inserted into the pre-formed hollow body, before the two wall sections are connected with each other. The opening of the pre-formed hollow body is provided here at the end of the shaft which runs out freely, i.e. the section which is connected to a pacifier shield, so that the channel formed by the linear element runs from the closed-walled suction section to the pacifier shield.

To form a ventilation channel, alternatively to the arrangement of a linear element in the hollow body whilst the wall sections are connected with each other, provision can also be made that in the forming of the pre-formed hollow body at least one channel-shaped depression is constructed extending from the cavity of the suction section through the shaft towards an opening.

To connect the two wall sections, it has proved to be advantageous if a pressure is selected for connecting the wall sections such that the wall thickness of the wall sections is reduced in the connecting region to at least 80% of the wall thickness of the wall sections before the connecting of the wall sections.

In order to remove undesired components from the material of the hollow body, which is particularly expedient in the case of the production of the hollow body from natural latex, it is advantageous if the hollow body is washed free of undesired chemical components, e.g. nitrosamines, before the connecting of the wall sections.

Furthermore, it is advantageous in particular in the case of rubber hollow bodies, if the hollow body is heated in the compressed state for preferably at least 30 min, in particular 30 to 45 min, to preferably 70 to 100° C. Hereby, a sufficient chemical cross-linking is achieved in the case of rubber hollow bodies between the wall sections themselves or between an elastic connecting layer and the wall sections. In addition, it is advantageous if the hollow body, after the wall sections are no longer pressed against each other, is heated for 20 to 30 h at approx. 70 to 100° C.; hereby, a complete vulcanizing of the rubber material of the hollow body and, if applicable, of the connecting material, is reliably achieved.

The pacifier teat of the type mentioned in the introduction is characterized in that opposite wall sections of an injected or dipped pre-formed elastic hollow body are connected with each other in the region of the shaft. By the connection of opposite wall sections in the region of the shaft, the wall sections of the previously pre-formed elastic hollow body lose their elastic restoring force in the region of the shaft, whereby advantageously with the use of the pacifier teat, no pressure is exerted by the pacifier teat onto the teeth or the jawbone sections existing in the region of the shaft.

In order to produce a connection in a simple manner between the opposite wall sections which is as far as possible permanent, it is advantageous if the connected wall sections are stuck to each other.

A particularly intimate connection between the wall sections is achieved if the connected wall sections are cross-linked with each other chemically and/or physically; such a connection is inseparable in particular also in the case of tensile stresses.

In order to make possible a pressure equalization between the substantially closed-walled suction section and the environment, it is advantageous if at least one channel, connecting the cavity with an opening, is provided in the shaft region.

Furthermore, to increase the elastic restoring force of the hollow body and at the same to achieve as small a wall thickness as possible in the region of the shaft, it is expedient if the wall in the region of the cavity has at least partially, in particular in the section adjoining the connecting region, a greater wall thickness than the hollow body in the shaft region before the connecting of the wall sections.

Figure 2:
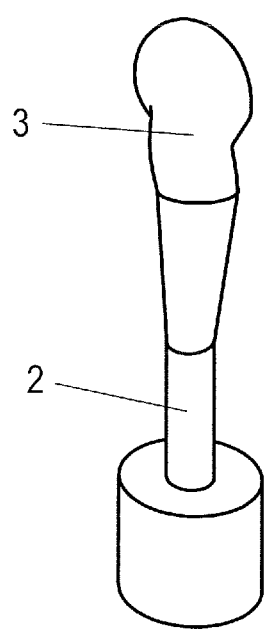
Figure 3:
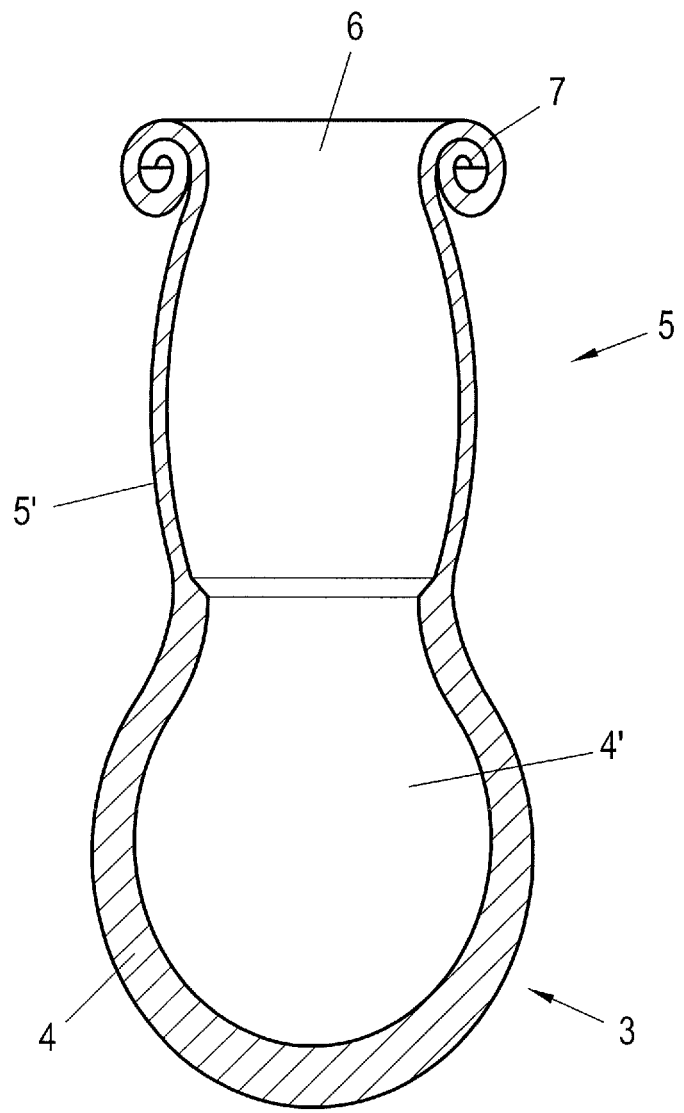
Figure 4:
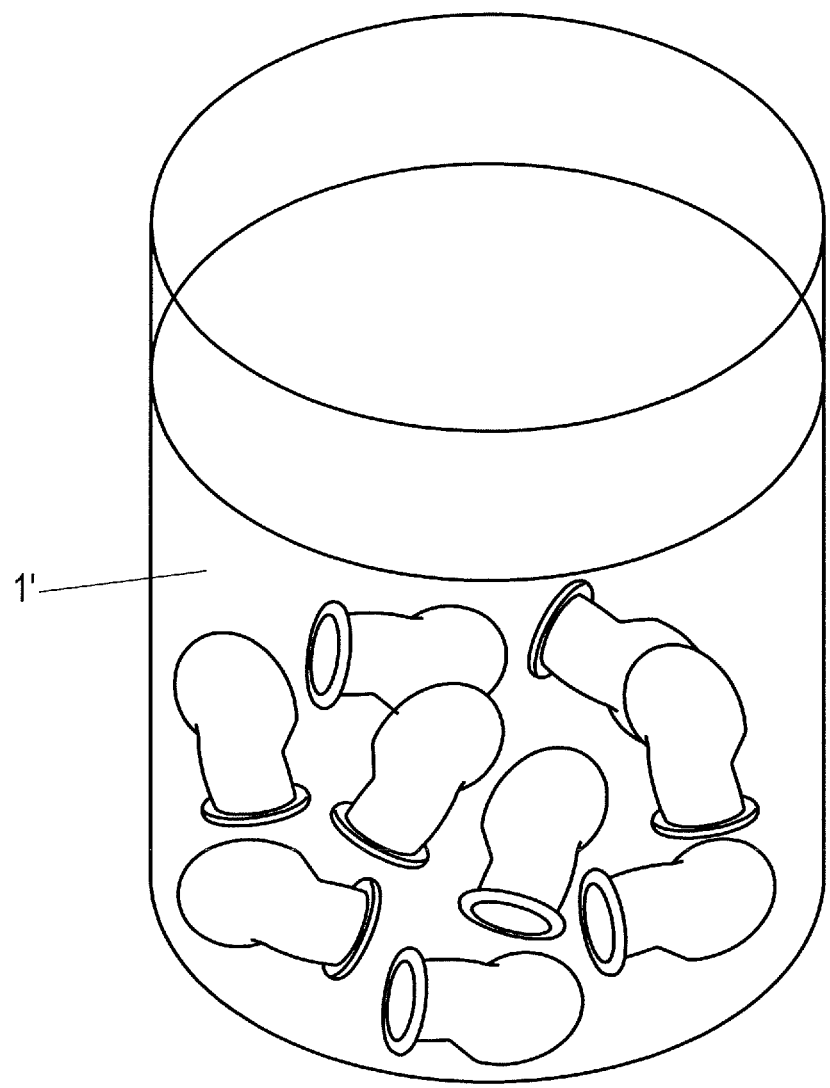
Figure 5:
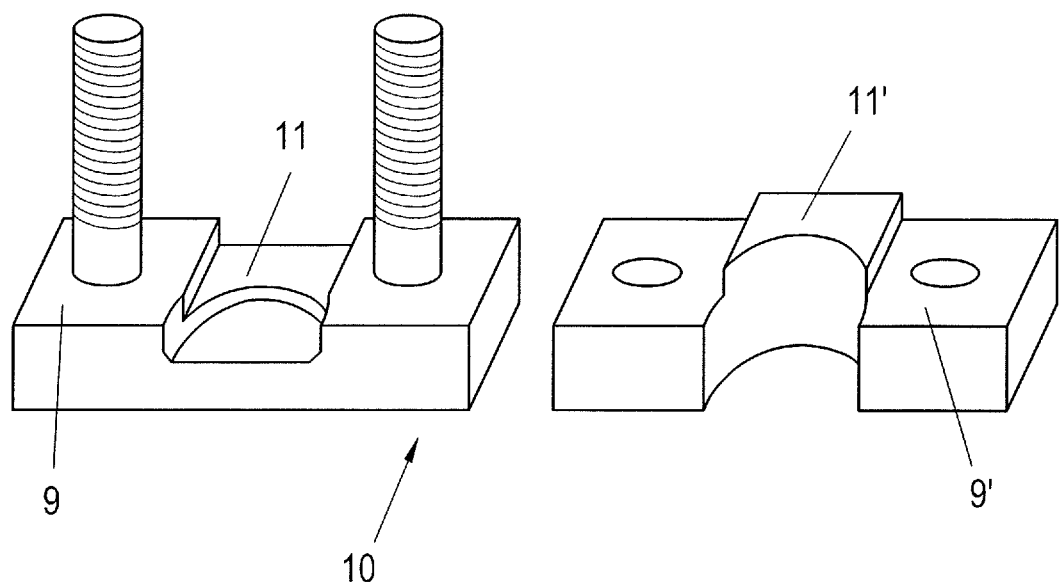
Figure 6:
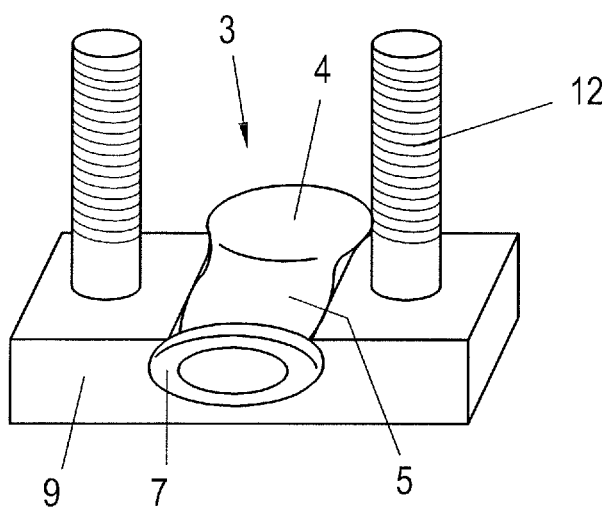
Figure 7:
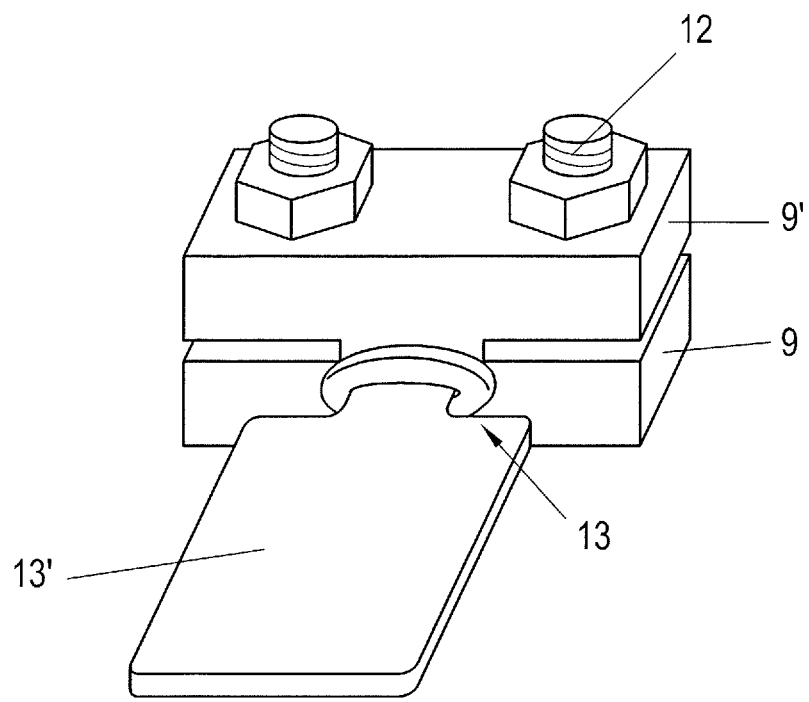
Figure 7A:
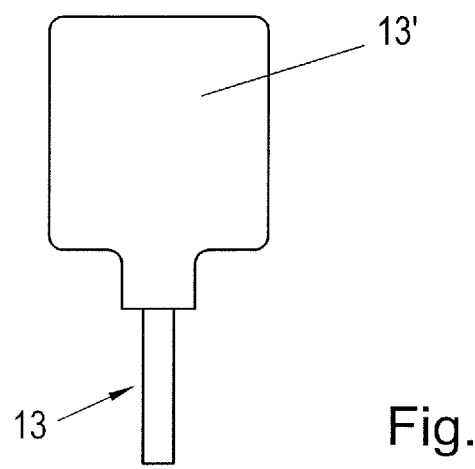
Figure 8:
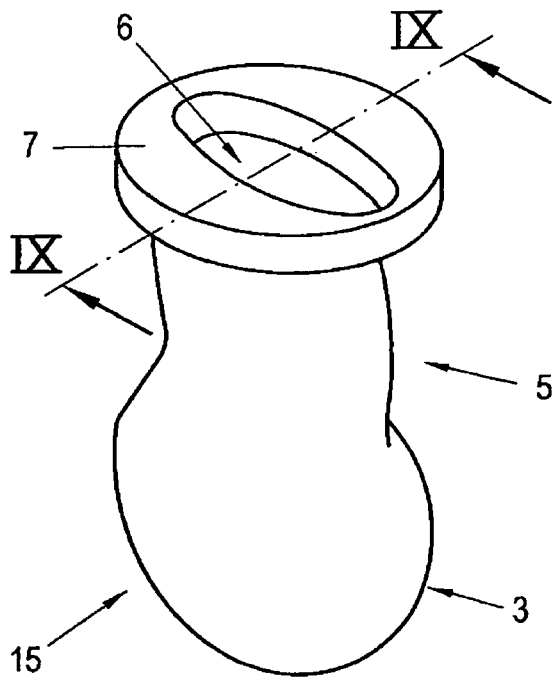
Figure 9:
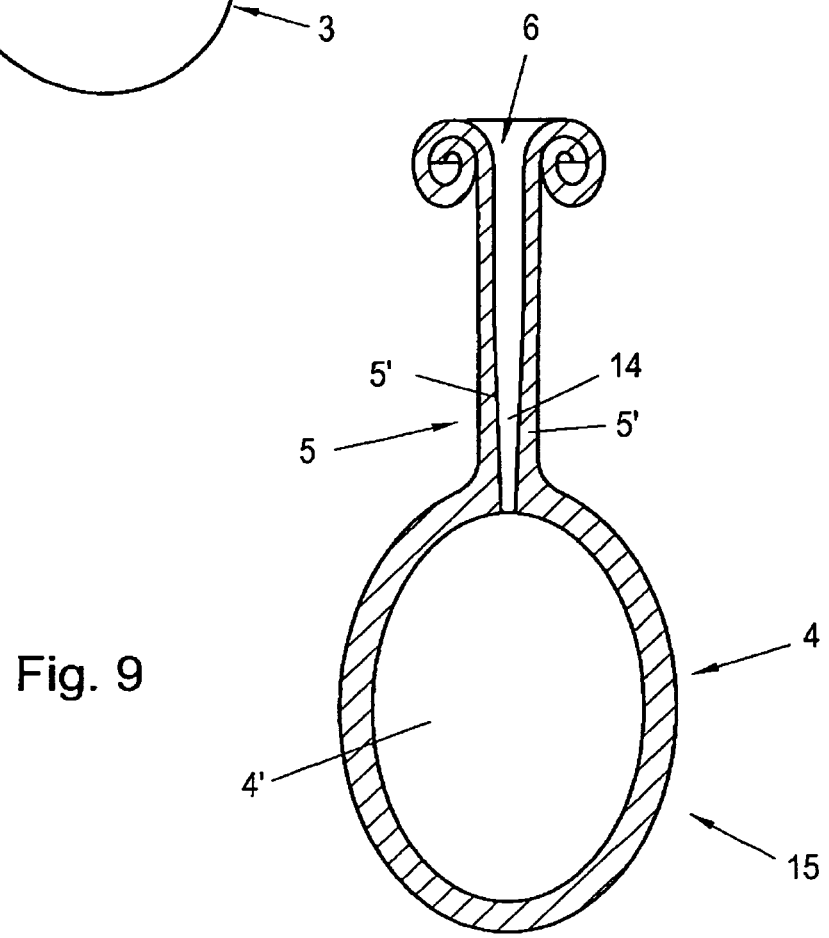
Figure 10:
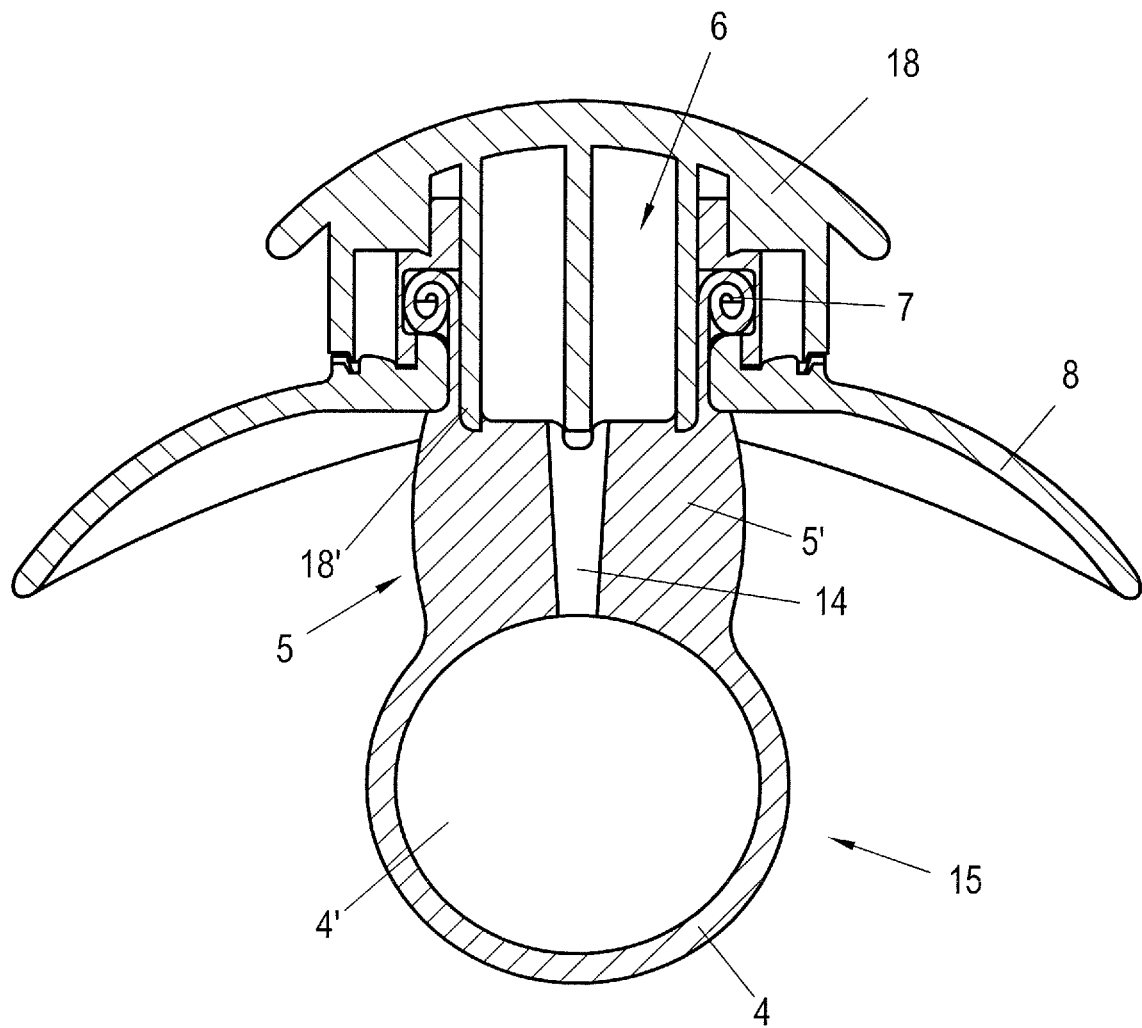

The invention is explained in detail below with the aid of a preferred example embodiment to which, however, it is not to be restricted. In detail, there are shown in the drawings:

FIG. 1 a view of an immersion bath for the production of a pre-formed hollow body;

FIG. 2 a view of the pre-formed hollow body after removal of the mould from the immersion bath;

FIG. 3 a sectional view of a pre-formed hollow body with walls sections which are not yet connected;

FIG. 4 a view of a washing solution for the purpose of cleaning the pre-formed hollow body;

FIG. 5 a perspective view of a clamping device for connecting the wall sections of a hollow body in an open position;

FIG. 6 a perspective view of the clamping device with a hollow body applied on the lower part;

FIG. 7 a perspective view of the clamping device in a closed position;

FIG. 7a a view of a pin element which is to be inserted into the hollow body;

FIG. 8 a perspective view of a pacifier teat after connecting of the wall sections;

FIG. 9 a sectional view of the pacifier teat according to the line IX-IX in FIG. 8; and FIG. 10 a sectional view of the pacifier teat after fastening to a pacifier shield.

In FIG. 1 a container 1 is shown, which is filled with a latex liquid. This is preferably natural latex which has a proportion of rubber or natural rubber of approximately 60% and a remainder which consists largely of water. An dipping mould 2 is immersed into the latex fluid, in order to produce a pre-formed hollow body 3 (cf. FIG. 3). The dipping mould 2 is advantageously preheated here to approx. 55-60° C., before it is immersed into the latex bath.

In FIGS. 2 and 3 a pre-formed hollow body 3 is shown, wherein in FIG. 2 the hollow body 3 has not yet been removed from the dipping mould 2. Alternatively to the production by means of a dipping method, the hollow body 3 shown in FIG. 3 can also be produced in an injection mould (not shown in further detail); production by the injection moulding method is particularly favourable in so far as the pre-formed hollow body 3 consists of silicone or of a thermoplastic elastomer (TPE).

In FIG. 3 the pre-formed hollow body 3 is shown, having a bulbous cavity 4' or suction section 4 and a shaft 5, which has an opening 6 at the end side. In addition, the shaft 5 has a flange 7 at the end side for the purpose of connecting with a pacifier shield 8 (cf. FIG. 10). The wall sections 5' in the region of the shaft 5 are not yet connected with each other. In particular, it can also be seen that the wall thickness in the region of the shaft 5 can be smaller than that in the region of the bulbous suction section 4, this being possible in a simple manner in particular with the production of a pre-formed hollow body 3 by means injection moulding; in production by the immersion method, the pre-formed hollow body 3 will usually have a substantially constant wall thickness.

In FIG. 4 a washing process is shown, as is usual in particular in the production of pacifier teats made of latex. Here, the pre-formed hollow bodies 3 are stored for approx. 24 to 30 hours in a washing solution held in a container 1', so that undesired components of the natural latex, in particular nitrosamines, are removed from the latex material.

Wall sections 5' of the shaft 5 are then connected with each other at least partially, so that the hollow body 3 no longer has any elastic restoring behaviour to restore the shape shown in FIG. 3 in the region of the shaft 5 after the connecting of the wall sections 5'.

Here, the wall sections 5' can either be connected with each other by a chemical and/or physical cross-linking or a bonding, i.e. an adhesion connection.

In FIG. 5 a clamping device 10 having two clamping parts 9, 9' can be seen. The clamping part 9 has a recess 11 here, which is provided for the (partial) reception of the pre-formed hollow body 3. The clamping part 9', on the other hand, has a projection 11', which is provided to exert an increased pressure onto the wall sections 5' which are to be connected in the braced state of the two clamping parts 9, 9'.

In the inserted state of the hollow body 3 in the clamping device 10, shown in FIG. 6, it can be seen that the bulbous suction section 4 and the end of the shaft 5 in the region of the flange 7 project beyond the corresponding clamping surfaces of the clamping device 10, so that an application of pressure and connecting of the opposite wall sections 5' occurs only in the region of the wall sections 5' which are to be connected. The clamping parts 9, 9' can be pressed against each other via tensioning elements 12, such as for example a screw/nut connection or hydraulically actuated bars or suchlike.

Before the clamping part 9' is applied onto the lower clamping part 9, a pin-shaped element 13 with a grip part 13' is inserted into the hollow body 3 (cf. FIG. 7a), so that after the connecting of the wall sections 5' of the hollow body 3 in the region of the clamping surfaces a channel 14 remains between the cavity 4' and the opening 6 of the pacifier teat 15 which is then completed. A pressure equalization is thus also guaranteed between the cavity 4' and the environment after the connecting of the wall sections 5' by means of the clamping device 10.

The clamping device 10 shown in FIGS. 5 to 7 is suited in particular for the connecting of wall sections of hollow bodies 3 produced from natural rubber. For the purpose of an intimate connection of the surfaces of the hollow body 3 in the region pressed against each other via the clamping surfaces, the rubber material of the hollow body 3 is not yet fully vulcanized on application of pressure. The clamping device 10, together with the hollow body 3 held therein, is then heated for approx. 30-45 min to approx. 70 to 80° C., so that the rubber material vulcanizes further; a chemical cross-linking of the opposite wall sections 5', which are pressed against each other, occurs here so that they are permanently connected with each other. The pacifier teats 15 are then removed from the clamping device 10 and the pin-shaped elements 13 are removed from the pacifier teats 15 by means of the grip 13', before the pacifier teats 15 are heated for approx. 24 to 30 h at approx. 70 to 100° C. in an oven, in order to achieve a complete vulcanizing or drying of the rubber material.

Alternatively or also in addition, a viscous latex connecting material, such as e.g. natural rubber, can be introduced into the region of the shaft 5. Such a connecting material (=latex concentrate) can have a proportion of approx. 40-60% latex and a viscosity of approx. 15-30 sec Ford beaker 5, so that owing to the low viscosity of the latex concentrate the amount which is introduced, which is usually approx. 1 to 2 ml, is distributed substantially uniformly in the region of the wall sections 5' of the hollow body 3 which are pressed against each other. The amount of introduced latex concentrate is selected here so that in a reliable manner no latex concentrate enters into the cavity 4', but rather all the introduced latex concentrate remains in the region of the wall sections 5' which are to be connected. After the introduction of the latex concentrate, one then proceeds further as described above for the purpose of connecting the wall sections 5'.

In so far as no connecting material is used which has substantially the same chemical structure, i.e. not as described above a latex concentrate with a pre-formed hollow body 3 of latex, but rather a connecting material forming an adhesion layer—after hardening—with a different chemical structure, an (adhesion) connection of the wall sections 5' can be achieved irrespective of the material of which the pre-formed hollow body consists. Preferably latex, silicone or a thermoplastic elastomer is used for the production of the hollow body 3 and hence of the pacifier teat 15.

As shown in FIG. 9, a channel 14, formed by the pin-shaped element 13', extends from the cavity 4' via the shaft 5 to the opening 6. The channel 14 therefore constitutes a connection from the cavity 4' to the opening 6, having a larger cross-section, or to the environment, so that a pressure equalization can take place reliably between the cavity 4' of the pacifier teat 15 and the environment.

In the sectional view according to FIG. 10, it can be seen that the shaft 5, which is constructed substantially with a single wall in the shaft region after the connecting of the two wall sections 5', is able to be mounted on a pacifier shield 8 in a conventional manner. For this, a fastening element 18 is provided which is known per se, which penetrates with a conical projection 18' into the opening 6, having a larger cross-section, of the hollow body 3, with the shaft 5 or the flange 7 then being received in a form-fitting and force-fitting manner between the pacifier shield 8 and the fastening part 18. As the channel 14 remains open in the connecting region with the pacifier shield 8 or the fastening element 18, a ventilation from the cavity 4' and a pressure equalization with the environment is reliably possible.

The invention claimed is:

1. A method for the production of a pacifier teat with a closed-walled suction section forming a cavity and with a shaft adjoining the suction section, comprising:
   pre-forming an elastic hollow body of the teat with the suction section and the shaft in an injection or in a dipping process, the pre-formed hollow body having an elastic restoring force and having opposite wall sections in the region of the shaft which are unconnected and distant to each other defining an opening at the end of the shaft,
   inserting a linear element through the opening into the pre-formed hollow body, until the linear element runs through the opening into the cavity formed by the suction section, for producing a pacifier with at least one channel in the region of the shaft connecting the cavity with the opening, and thereafter
   pressing against each other said opposite wall sections of the pre-formed hollow body with each other in the region of the shaft while the linear element is inserted in the pre-formed hollow body, wherein application of pressure and connecting of said opposite wall sections occur only in a region of said opposite wall sections to be connected, and
   connecting said opposite wall sections where a jawbone or tooth abutment by an infant occurs in use apart from said channel which remains open, such that by means of the connection of the opposite wall sections the elastic restoring force of the hollow body is eliminated in the shaft region, wherein the linear element is arranged within the hollow body and said opposite wall sections are connected with each other in the region of said opposite wall sections.

2. The method according to claim 1, wherein a connecting material in viscous form is introduced between the opposite wall sections and the connecting material is subsequently transferred into an elastic state under the influence of pressure and/or heat for the purpose of connecting the wall sections.

3. The method according to claim 2, wherein a pressure for connecting the wall sections is selected such that the wall thickness of the wall sections in the connecting region is reduced to at least 80% of the wall thickness of the wall sections before the connecting of the wall sections.

4. The method according to claim 2, wherein the hollow body is heated to preferably 70 to 100° C. while applying pressure or contacting the wall sections for preferably at least 30 min.

5. The method according to claim 2, wherein after the wall sections are connected, the hollow body is heated in an oven for between 20 and 30 h at approx. 70 to 100° C.

6. The method according to claim 1, wherein the hollow body consists of a rubber material which is not yet fully vulcanized, wherein the wall sections which are to be connected are brought in contact with each other before the rubber material is fully vulcanized by means of supplying heat.

7. The method according to claim 1, wherein the hollow body is washed free of undesired chemical components before the connecting of the wall sections.

8. A method for the production of a pacifier teat with a closed-walled suction section forming a cavity and with a shaft adjoining the suction section, comprising:
   pre-forming an elastic hollow body of the teat with the suction section and the shaft in an injection or in a dipping process, the pre-formed hollow body having an elastic restoring force and having opposite wall sections in the region of the shaft which are unconnected and distant to each other defining an opening at the end of the shaft, wherein at least one channel-shaped depression is formed, extending from the cavity of the suction section through the shaft towards said opening, and thereafter
   pressing against each other said opposite wall sections of the pre-formed hollow body with each other in the region of the shaft while a linear element is inserted in the pre-formed hollow body, wherein application of pressure and connecting of said opposite wall sections occur only in a region of said opposite wall sections to be connected, and
   connecting said opposite wall sections where a jawbone or tooth abutment by an infant occurs in use apart from said channel-shaped depression which remains open, such that by means of the connection of the opposite wall sections the elastic restoring force of the hollow body is eliminated in the shaft region, wherein the linear element is arranged within the hollow body and said opposite wall sections are connected with each other in the region of said opposite wall sections,
   wherein a whole portion of said channel-shaped depression extending from the cavity of the suction section through the shaft towards said opening remains open.

* * * * *